(12) United States Patent
Wippermann et al.

(10) Patent No.: US 11,460,613 B2
(45) Date of Patent: Oct. 4, 2022

(54) MULTI-APERTURE IMAGING DEVICE OF LOW STRAY LIGHT SENSITIVITY, IMAGING SYSTEM AND METHOD FOR PROVIDING A MULTI-APERTURE IMAGING DEVICE

(71) Applicant: Fraunhofer-Gesellschaft zur Förderung der angewandten Forschung e.V., Munich (DE)

(72) Inventors: Frank Wippermann, Meiningen (DE); Jacques Duparré, Jena (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 464 days.

(21) Appl. No.: 16/730,034

(22) Filed: Dec. 30, 2019

(65) Prior Publication Data

US 2020/0132889 A1    Apr. 30, 2020

Related U.S. Application Data

(63) Continuation of application No. PCT/EP2018/068140, filed on Jul. 4, 2018.

(30) Foreign Application Priority Data

Jul. 6, 2017    (DE) .......................... 102017211586.6

(51) Int. Cl.
*H04N 13/207*      (2018.01)
*G02B 5/00*        (2006.01)
(Continued)

(52) U.S. Cl.
CPC ......... *G02B 5/005* (2013.01); *G02B 26/0816* (2013.01); *H04N 5/2252* (2013.01); *H04N 5/2254* (2013.01); *H04N 13/207* (2018.05)

(58) Field of Classification Search
CPC .................................................. H04N 13/207
(Continued)

(56) References Cited

U.S. PATENT DOCUMENTS 5,036,351 A       7/1991  Frick et al.
2014/0055624 A1*  2/2014  Gaines ..................... G02B 5/08
                                                      348/207.1
(Continued)

FOREIGN PATENT DOCUMENTS

DE    102013209246 A1    11/2014
DE    102015215841 A1     2/2017
(Continued)

OTHER PUBLICATIONS

Niranjan Kumar, "Office Action for IN Application No. 201937053393", dated May 7, 2021, Intellectual Property India, India.

*Primary Examiner* — Joel W Fosselman
(74) *Attorney, Agent, or Firm* — Novick, Kim & Lee, PLLC; Jae Youn Kim; Jihun Kim

(57) ABSTRACT

A multi-aperture imaging device includes an array of optical channels, wherein each optical channel includes optics for imaging a partial field of view of a total field of view onto an image sensor region of an image sensor. The multi-aperture imaging device includes a beam-deflecting unit for deflecting an optical path of the optical channels to a viewing direction of the multi-aperture imaging device. The multi-aperture imaging device includes a diaphragm structure arranged to at least partly close a gap between the array and the beam-deflecting unit.

22 Claims, 13 Drawing Sheets

(51) Int. Cl.
*G02B 26/08* (2006.01)
*H04N 5/225* (2006.01)

(58) Field of Classification Search
USPC ...................................................... 359/226.1
See application file for complete search history.

(56) References Cited

U.S. PATENT DOCUMENTS

| | | |
|---|---|---|
| 2016/0255330 A1 | 9/2016 | Braeuer et al. |
| 2017/0118388 A1 | 4/2017 | Braeuer et al. |
| 2017/0264825 A1 | 9/2017 | Braeuer et al. |
| 2018/0172945 A1 | 6/2018 | Braeuer et al. |
| 2018/0176437 A1 | 6/2018 | Braeuer et al. |
| 2018/0176471 A1 | 6/2018 | Braeuer et al. |
| 2018/0176472 A1 | 6/2018 | Braeuer et al. |
| 2018/0176473 A1 | 6/2018 | Braeuer et al. |
| 2018/0184068 A1 | 6/2018 | Braeuer et al. |
| 2018/0198963 A1 | 7/2018 | Braeuer et al. |
| 2018/0241920 A1 | 8/2018 | Lange et al. |
| 2018/0246415 A1 | 8/2018 | Bach et al. |
| 2018/0324334 A1 | 11/2018 | Braeuer et al. |
| 2019/0011809 A1 | 1/2019 | Braeuer et al. |
| 2019/0068950 A1 | 2/2019 | Braeuer et al. |
| 2019/0104242 A1 | 4/2019 | Braeuer et al. |
| 2019/0394398 A1 | 12/2019 | Braeuer et al. |

FOREIGN PATENT DOCUMENTS

| | | |
|---|---|---|
| DE | 102015220566 A1 | 4/2017 |
| DE | 102016200287 A1 | 7/2017 |
| DE | 102016204148 A1 | 9/2017 |
| JP | 2955720 B2 | 10/1999 |
| JP | 2008164673 A | 7/2008 |
| KR | 1020090116731 A | 11/2009 |
| KR | 1020130030065 A | 3/2013 |
| TW | 201710727 A | 3/2017 |
| TW | 201711443 A | 3/2017 |
| TW | 201713991 A | 4/2017 |
| TW | 201713992 A | 4/2017 |
| WO | 2017067977 A1 | 4/2017 |

* cited by examiner

1200

```
┌─────────────────────────────────────────────────────┐
│ Providing an array of optical channels so that each │
│ optical channel comprises optics for imaging a      │
│ partial field of view of a total field of view onto │──1210
│ an image sensor region of an image sensor           │
└─────────────────────────────────────────────────────┘
                          │
                          ▼
┌─────────────────────────────────────────────────────┐
│ Arranging beam-deflecting means for deflecting an   │
│ optical path of the optical channels to a viewing   │──1220
│ direction of the multi-aperture imaging device      │
└─────────────────────────────────────────────────────┘
                          │
                          ▼
┌─────────────────────────────────────────────────────┐
│ Arranging a diaphragm structure to at least party   │
│ close a gap between the array and the beam-         │──1230
│ deflecting means                                    │
└─────────────────────────────────────────────────────┘
```

Fig. 12

MULTI-APERTURE IMAGING DEVICE OF LOW STRAY LIGHT SENSITIVITY, IMAGING SYSTEM AND METHOD FOR PROVIDING A MULTI-APERTURE IMAGING DEVICE

CROSS-REFERENCES TO RELATED APPLICATIONS

This application is a continuation of copending International Application No. PCT/EP2018/068140, filed Jul. 4, 2018, which is incorporated herein by reference in its entirety, and additionally claims priority from German Application No. DE 10 2017 211 586.6, filed Jul. 6, 2017, which is incorporated herein by reference in its entirety.

The present invention relates to a multi-aperture imaging device, to an imaging system and to a method for providing a multi-aperture imaging device. In addition, the present invention relates to a multi-aperture imaging device and to a multi-aperture imaging system having a potentially flexible diaphragm at means for switching the viewing direction.

BACKGROUND OF THE INVENTION

Conventional cameras comprise an imaging channel which images the entire object field. The cameras comprise adaptive components allowing relative lateral, two-dimensional displacement between objective and image sensor for realizing an optical image-stabilization function.

Multi-aperture imaging systems having a linear channel arrangement consist of several imaging channels which each capture only a part of the object and contain a deflection mirror. The deflection mirror can be supported to be rotatable and, among other things, allow switching the viewing direction so that the same camera can be directed in different viewing directions, the viewing directions forming an angle of, for example, 180°.

It would be desirable to provide concepts for multi-channel capturing of object regions or fields of view, allowing high-quality image capturing.

SUMMARY

According to an embodiment, a multi-aperture imaging device may have: an array of optical channels, wherein each optical channel includes optics for imaging a partial field of view of a total field of view onto an image sensor region of an image sensor; a beam-deflecting unit for deflecting an optical path of the optical channels to a viewing direction of the multi-aperture imaging device; and a diaphragm structure arranged to at least partly close a gap between the array and the beam-deflecting unit; wherein the array includes, arranged at a distance to the beam-deflecting unit, a carrier for holding the optics, a housing of the array or a transparent structure configured to at least partly reduce the entrance of particles to the beam-deflecting unit, the distance forming the gap; and wherein the diaphragm structure closes the gap by mechanical contact with the carrier, the housing or the transparent structure on the one hand and the beam-deflecting unit on the other hand.

Another embodiment may have an imaging system including a first module including an inventive multi-aperture imaging device and a second module including an inventive multi-aperture imaging device, wherein the first and second modules are configured to capture the total field of view at least stereoscopically.

According to another embodiment, a method for providing a multi-aperture imaging device may have the steps of: providing an array of optical channels so that each optical channel includes optics for imaging a partial field of view of a total field of view onto an image sensor region of an image sensor; arranging a beam-deflecting unit for deflecting an optical path of the optical channels to a viewing direction of the multi-aperture imaging device; and arranging a diaphragm structure in order to at least partly close a gap between the array and the beam-deflecting unit; so that the array includes, arranged at a distance to the beam-deflecting unit, a carrier for holding the optics, a housing of the array or a transparent structure configured to at least partly reduce the entrance of particles to the beam-deflecting unit, the distance forming the gap; and so that the diaphragm structure closes the gap by mechanical contact with the carrier, the housing or the transparent structure on the one hand and the beam-deflecting unit on the other hand.

A finding of the present invention is having recognized that, by arranging an additional diaphragm structure for closing a gap between beam-deflecting means and an array of optical channels, stray light entering from a direction which the multi-aperture imaging device is not directed to at that moment can be reduced or even prevented so that high-quality image capturing can be achieved based on a low degree of stray light.

In accordance with an embodiment, a multi-aperture imaging device comprises an array of optical channels, each optical channel comprising optics for imaging a partial field of view of a total field of view onto an image sensor region of an image sensor. The multi-aperture imaging device comprises beam-deflecting means for deflecting an optical path of the optical channels to a viewing direction of the multi-aperture imaging device. In addition, the multi-aperture imaging device comprises a diaphragm structure arranged to at least partly close a gap between the array and the beam-deflecting means.

Further embodiments relate to an imaging system and to a method for providing a multi-aperture imaging device.

BRIEF DESCRIPTION OF THE DRAWINGS

Embodiments of the present invention will be detailed subsequently referring to the appended drawings, in which:

FIG. 12 shows a schematic flowchart of a method for providing a multi-aperture imaging device in accordance with an embodiment.

DETAILED DESCRIPTION OF THE INVENTION

Figure 1:
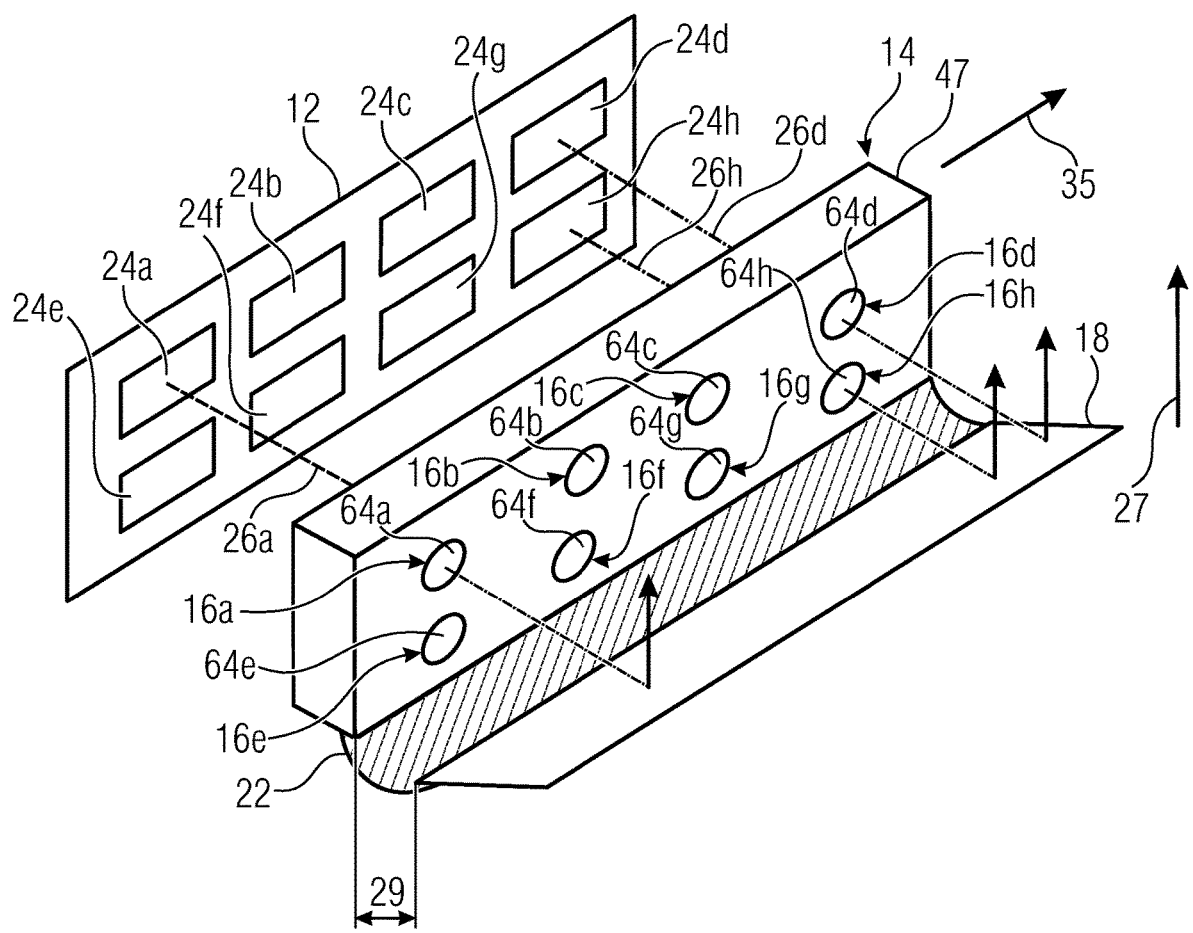
FIG. 1 shows a schematic perspective view of a multi-aperture imaging device in accordance with an embodiment.

Before describing below in greater detail embodiments of the present invention making reference to the drawings, it is pointed out that identical elements, objects and/or structures or those of equal function or equal effect, in the different figures, are provided with the same reference numerals so that the description of these elements, illustrated in different embodiments, is mutually exchangeable or mutually applicable.

FIG. 1 shows a schematic perspective view of a multi-aperture imaging device 10 in accordance with an embodiment. The multi-aperture imaging device 10 comprises an image sensor, an array of optical channels 16a-h, beam-deflecting means 18 and a diaphragm structure 22. Each optical channel 16a-h comprises optics 64a-h for imaging a partial field of view of a total field of view onto an image sensor region 24a-h of the image sensor 12. The optical channels 16a-h can be understood to represent a course of optical paths 26a-h. The optical paths 26a-h can be influenced by the respective optics 64a-h arranged in the array 14, like by scattering or concentrating. The individual optical channels 16a-h may each form or comprise complete imaging optics and comprise at least one optical component or optics, like a refractive, diffractive or hybrid lens, and can image a section of the total object captured as a hole by the multi-aperture imaging device. This means that one, several or all of the optics 64a-h may also be a combination of optical elements. An aperture diaphragm can be arranged relative to one, several or all of the optical channels 16a-h.

The image sensor regions 24a-h may, for example, each be formed from a chip which comprises a corresponding pixel array, wherein the image sensor regions 24a-h may be mounted on a common substrate or common circuit carrier, like a common circuit board or a common flex board. Alternatively, it would also be conceivable for the image sensor regions 24a-h each to be formed from a part of a common pixel array which extends continuously over the image sensor regions 24a-h, wherein the common pixel array is, for example, formed on a single chip. Exemplarily, only the pixel values of the common pixel array in the image sensor regions 24a-h are read out. Different mixtures of these alternatives are also possible, like one chip being present for two or more optical channels and another chip being present in turn for different optical channels or the like. In the case of several chips of the image sensor 12, these may, for example, be mounted on one or several circuit boards or circuit carriers, like all of them together or in groups or the like.

The beam-deflecting means 18 is configured to deflect the optical paths 26a-h of the optical channels 16a-h. Here, the beam-deflecting means 18 may exemplarily comprise a reflective main side which faces the optics 64a-h or array 14 and is inclined relative to the same. Due to the inclination, the optical paths 26a-h can be deflected to a viewing direction 27, wherein the viewing direction 27 can describe a relative direction relative to the multi-aperture imaging device 10, along which the object region to be captured is arranged.

The array may comprise, arranged at a distance to the beam-deflecting means, a carrier for holding the optics, a housing of the array and/or a transparent structure configured to at least partly reduce the entrance of particles to the beam-deflecting means, wherein the distance forms the gap. A gap 29, i.e. a distance, is located between the array 14 and the beam-deflecting means 18. The multi-aperture imaging device 10 here is implemented such that the diaphragm structure 22 at least partly closes the gap 29. Thus, the diaphragm structure 22 may, as is illustrated, overlap the array 14 or a carrier 47 and/or the beam-deflecting means 18. This means that the diaphragm structure 22 may be in mechanical contact with the array 14 and/or the beam-deflecting means 18, or be arranged outside a region or volume arranged spatially between the beam-deflecting means 18 and the array 14. As an alternative to the mechanical contact to the array 14, the diaphragm structure 22 may be in mechanical contact with a transparent structure, like a transparent structure 42 which will be discussed below in connection with FIG. 7. Alternatively, the diaphragm structure 22 may be arranged at the array 14 and/or the beam-deflecting means 18 such that the diaphragm structure is located spatially between the array 14 and the beam-deflecting means 18. In both cases, the gap 29 between the array 14 and the beam-deflecting means 18 is closed at least partly, i.e. by at least 50%, at least 70%, at least 90% or, advantageously, completely.

A plurality or multitude of partial fields of view of a total field of view may be captured by the optical channels, wherein each partial field of view may be captured by at least one optical channel 16a-h. A partial field of view may consequently be associated to each optical channel, which is captured by the optical channel. To each partial field of view, for example when starting from the multi-aperture imaging device 10 and/or the beam-deflecting means 18, a direction can be associated which the respective optical path 26a-h of the optical channel 16a-h is deflected to by the beam-deflecting means 18. The diaphragm structure 22 can be configured to prevent or reduce at least partly the entrance of light, in particular from a direction differing from the directions associated to the partial fields of view of the currently set viewing direction. By arranging the diaphragm structure 22 at an end of the carrier 47 and/or the beam-deflecting means 18, arranged or positioned opposite to the viewing direction 27, the entrance of stray light from the direction opposite to the viewing direction 27 can be reduced at least partly. When the gap 29 is closed completely and the diaphragm structure 22 is formed to be completely opaque, an extent of stray light from, for example, the direction opposite to the viewing direction, or also further directions, may even be reduced completely. With an increasing degree of reducing stray light, the image quality can be improved to an increasing extent.

Figure 2:
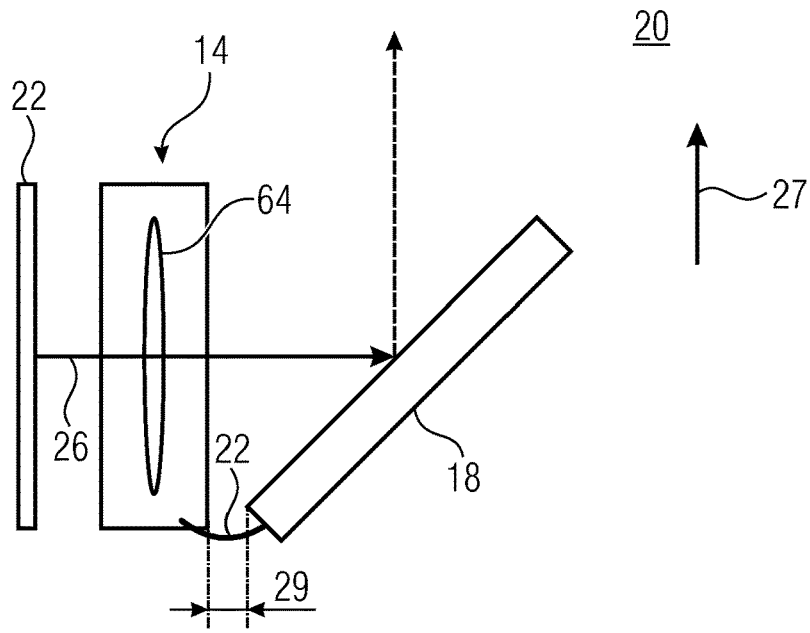
FIG. 2 shows a schematic sectional side view of a multi-aperture imaging device in accordance with an embodiment wherein an array of optical channels is formed in a single line.

FIG. 2 shows a schematic sectional side view of a multi-aperture imaging device 20 in accordance with an embodiment wherein the array 14 is formed in a single line, which means that, in contrast to the double-line array of FIG. 1, only a single line of optics 64 is arranged.

The diaphragm structure 22 can be fixedly connected mechanically to at least one of the array 14 and/or the beam-deflecting means 18 and thus be held by this element. A loose or also fixed mechanical contact can be obtained at the other element in order to close the gap 29.

Figure 3:
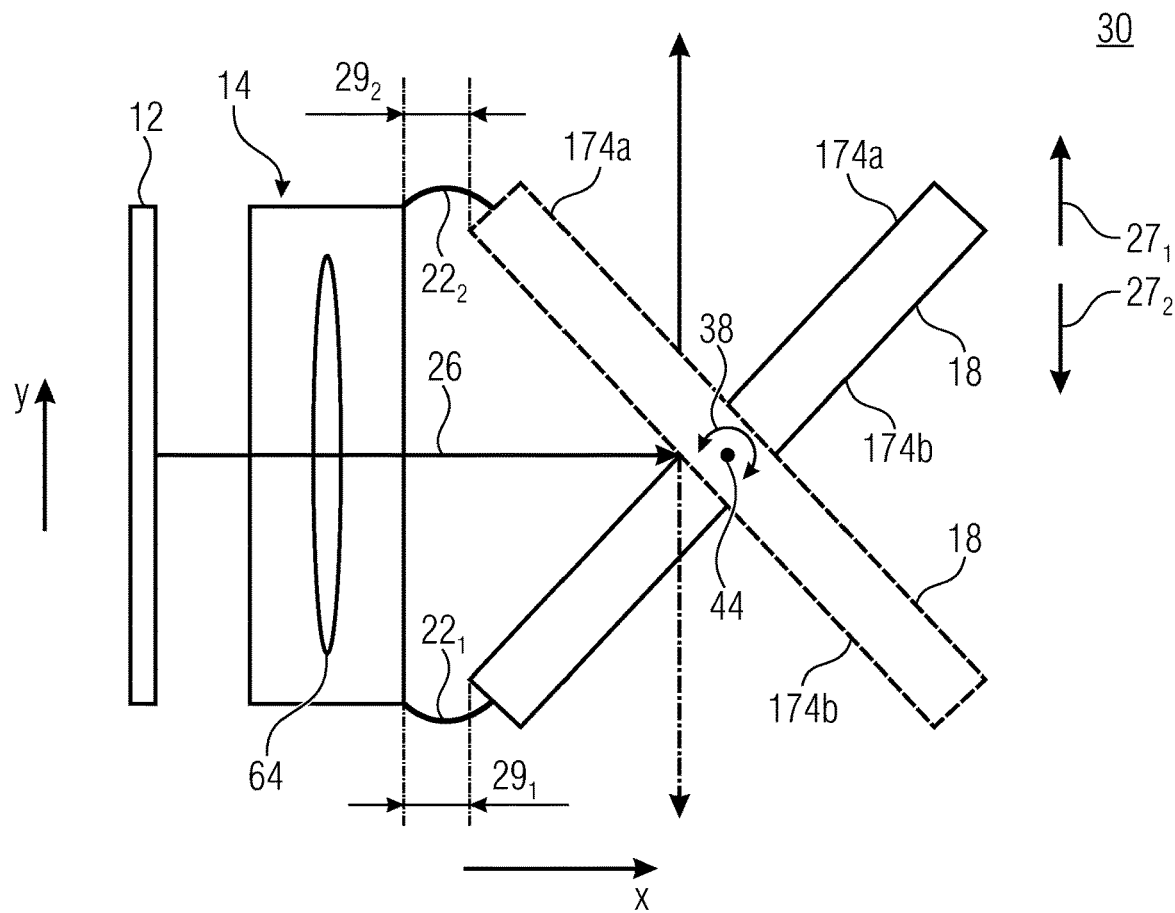
FIG. 3 shows a schematic sectional side view of a multi-aperture imaging device in accordance with an embodiment wherein the beam-deflecting means is configured to perform a rotational movement around a rotational axis.

FIG. 3 shows a schematic sectional side view of a multi-aperture imaging device 30 in accordance with another embodiment wherein the beam-deflecting means 18 is configured to perform a rotational movement 38 around a rotational axis 44, wherein a first position and a second position of the beam-deflecting means 18 can be obtained based on the rotational movement 38. The beam-deflecting means 18 is configured to, in the first position, direct the optical paths 26 to a first viewing direction $27_1$. In addition, the beam-deflecting means 18 is configured to redirect, in a second position, illustrated by a broken and dotted line, the optical paths 26 to a second viewing direction $27_2$. The beam-deflecting means 18 may, for example, comprise two opposite and reflective main sides 174a and 174b, wherein different reflective main sides 174a or 174b are facing the optics 64 in the different positions. This means that, in the different positions, the beam-deflecting means 18 deflects the optical paths with different main sides.

Based on the positions between which can be switched by the rotational movement 38, in a first position, a first gap $29_1$ can be closed at least partly by a diaphragm structure $22_1$, as is, for example, described in connection with the multi-aperture imaging device 20. Based on the rotational movement 38, the gap 291 may vary in its dimension along a direction x which is in parallel to a direction starting from the image sensor 12 towards the beam-deflecting means 18 and in parallel to a line extension direction of the array 14. In the second position, the gap $29_2$ can be closed by the diaphragm structure $22_2$ in order to prevent stray light from entering from the unused viewing direction $27_1$.

In accordance with some requirements to multi-aperture imaging devices, low or even minimal a height of the multi-aperture imaging device is desired along a direction perpendicular to the x-direction and perpendicular to the line extension direction, like along a y-direction which may also be referred to as thickness direction. Due to the diagonal arrangement of the beam-deflecting means 18 relative to the image sensor 12 and/or the array 14, a deviation of area of the beam-deflecting means 18 may be comparatively greater than an area of the image sensor 12 for allowing complete imaging and/or deflection of the optical path 26. This means that, if the beam-deflecting means 18 was inclined such that the main sides 174a and/or 174b were arranged in parallel to the y-direction, the beam-deflecting means 18 might be taller than the array 14 and/or the image sensor 12, which counteracts the minimal structural height strived for.

For switching between the two positions illustrated, it is also possible to drive the beam-deflecting means 18 such that the main sides 174a and/or 174b are in parallel to the x-direction in a position between the first and second positions. In this case, secondary sides of the beam-deflecting means 18 may come closer to the array 14 during the movement and/or withdraw from the same so that the gap $29_1$ and/or $29_2$ changes in its dimension. However, at the same time, a finite distance may be used between the beam-deflecting means 18 and the array 14 in order to allow a corresponding movement. This distance results in the gaps $29_1$ and/or $29_2$ which may be closed by the diaphragm structures $22_1$ and/or $22_2$ described in order to at least partly prevent stray light from entering through the corresponding gaps.

In other words, a distance may be set between a front edge of the mirror (beam-deflecting means) and the subsequent array of imaging optics in order for the deflection mirror to be able to rotate. This gap is transparent and, consequently, transmissive for light. This means that light may enter the structure disadvantageously from a direction which does not correspond to the intended viewing direction of the camera and which consequently deteriorates the imaging quality. This effect can be counteracted by the diaphragm structures $22_1$ and/or $22_2$.

A diaphragm extending over the entire extension of the beam-deflecting means and, thus, extending over the entire width of the array objective, made from an opaque and/or flexible material, can be arranged at the side/edge of the beam-deflecting means of the multi-aperture imaging device having a linear channel arrangement. This may, for example, resemble the effect of a sealing lip.

Before describing below further details of the multi-aperture imaging devices described herein, an embodiment of the beam-deflecting means 18 is to be discussed. Although the same may also be implemented as a planar mirror or a double-sided mirror, a space-saving realization may be obtained based on a wedge-shape. In addition, several wedges may be arranged in the beam-deflecting means 18 and each form a facet thereof, wherein each optical channel of the multi-aperture imaging device is associated to a facet. Due to different inclinations of the facets to the reference position of the beam-deflecting means, the optical paths can be deflected to different directions, which allows divergence of the deflection of direction, i.e. a differing deflection of direction or difference between two deflections of direction, so that different sub-regions of the entire object region can be captured.

Making reference to FIGS. 4a-f, advantageous implementations of the beam-deflecting means 18 will be described. The implementations show a number of advantages which may be executed individually or in any combination, but have no limiting effect.

Figure 4A:
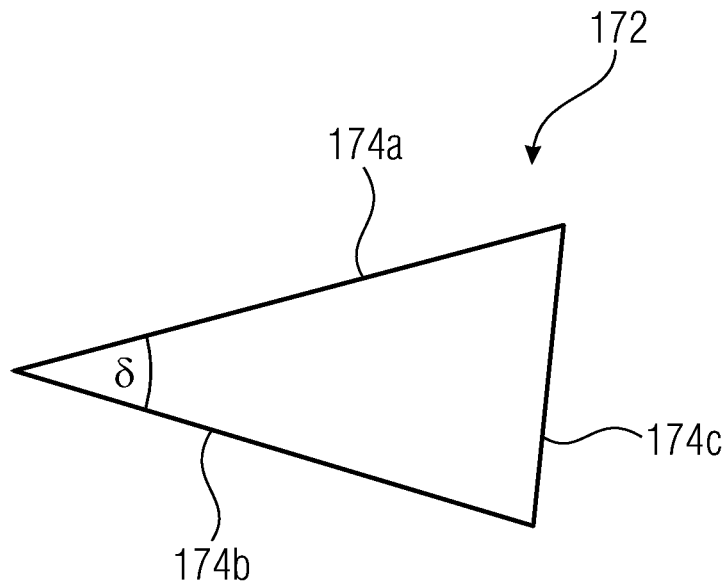
FIGS. 4a-f show advantageous implementations of beam-deflecting means in accordance with embodiments.

FIG. 4a shows a schematic sectional side view of a beam-deflecting element 172 which in beam-deflecting means described here may be employed as one of the beam-deflecting regions 46. The beam-deflecting element 172 may be effective for one, a plurality of or all of the optical channels 16a-d and comprise a cross-section of a sequence of polygons. Although a triangular cross-section is shown, any other polygon may also be used. Alternatively or additionally, the cross-section may also comprise at least one curved surface, wherein, in particular in reflective surfaces, a, at least in portions, planar implementation may be of advantage in order to avoid imaging errors. The two main sides 174a and 174b may be inclined relative to each other by an angle δ. The angle δ may exhibit a value between 1° and 89°, but advantageously comprises a value between 5° and 60° and, particularly advantageously, a value between 10° and 30°. This means that the main sides 174a and 174b are advantageously arranged to be inclined relative to each other by an angle of at most 60°.

The beam-deflecting element 172 exemplarily comprises a first side 174a, a second side 174b and a third side 174c. At least two sides, like the sides 174a and 174b, are implemented to be reflective so that the beam-deflecting element 172 is implemented to be reflective on both sides. The sides 174a and 174b may be the main sides or faces of the beam-deflecting element 172, i.e. sides the area of which is greater than that of the side 174c.

In other words, the beam-deflecting element 172 may be formed to be wedge-shaped and reflective on both sides. Opposite to the side 174c, i.e. between the sides 174a and 174b, there may be another side which, however, is considerably smaller than the side 174c. In other words, the wedge formed by the sides 174a, 174b and 174c, is not tapering as desired, but, at the pointed side, is provided with a face and, consequently, truncated.

Figure 4B:
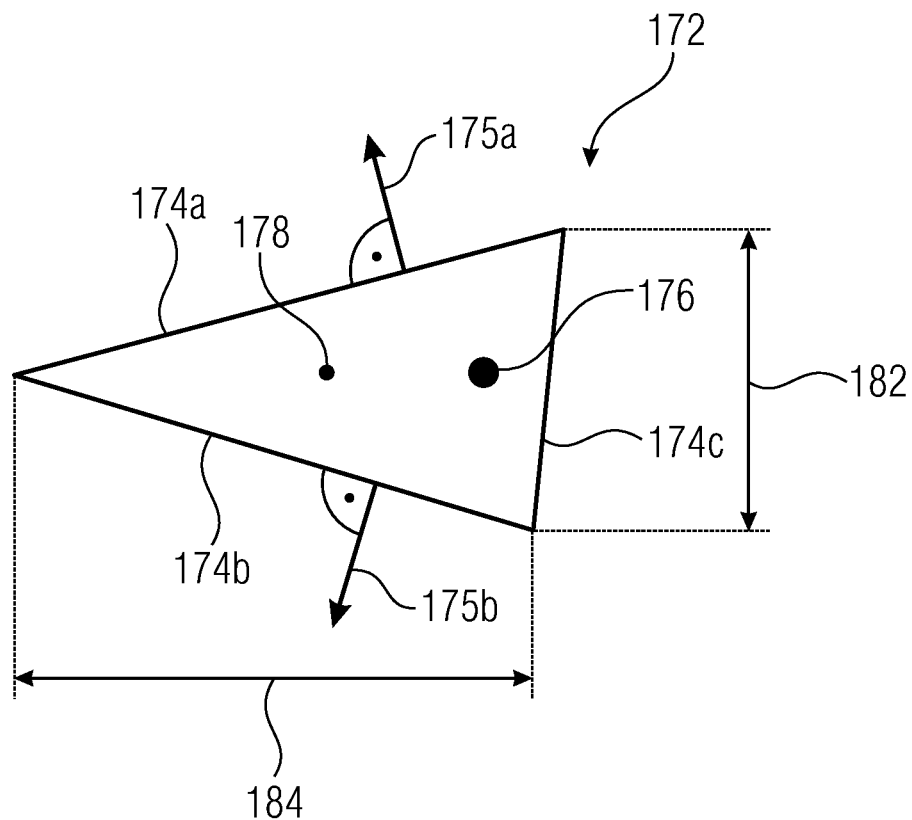

FIG. 4b shows a schematic sectional side view of the beam-deflecting element 172 where a suspension or displacement axis 176 of the beam-deflecting element 172 is described. The displacement axis 176 may, for example, be the rotational axis 44. The displacement axis 176 around which the beam-deflecting element 172 may be moveable in a rotational and/or translational manner in the beam-deflecting means 18, may be displaces eccentrically relative to a centroid 178 of the cross-section. The centroid may alternatively also be a point describing half the dimension of the beam-deflecting element 172 along a thickness direction 182 and along a direction 184 perpendicular thereto.

The main side 174a may comprise a surface normal 175a, whereas the main side 174b may comprise a surface normal 175b. When using a rotational movement around the displacement axis 176 in order to switch between the first position and the second position of the beam-deflecting means, the rotational movement of the beam-deflecting means can be performed such that, between the two positions, an orientation can be avoided according to which one of the main sides 174a or 174b is completely facing the array 14, as is described in connection with FIG. 3. This may also be understood to imply that, during a change between the first and second operating states or positions by the rotational movement, the surface normal 175a and the surface normal 175b of the second main side, at any point in time, exhibit an angle of at least 10° relative to a direction towards the image sensor and, maybe, in parallel to a surface normal of the image sensor. Thus, it can be avoided that one of the angles is 0° or 180°, which means a high or approximately maximum extension of the beam-deflecting means along the thickness direction.

The displacement axis 176 may, for example, be unchanged along a thickness direction 182 and exhibit any offset in a direction perpendicular thereto. Alternatively, an offset along the thickness direction 182 is also conceivable. Displacing may, for example, take place such that, with a rotation of the beam-deflecting element 172 around the displacement axis 176, greater a control path is obtained than in the case of a rotation around the centroid 178. This means that, due to the displacement of the displacement axis 176, the path by which the edge between the sides 174a and 174b is moved in the case of a rotation, may increase with an equal angle of rotation when compared to a rotation around the centroid 178. Advantageously, the beam-deflecting element 172 is arranged such that the edge, i.e. the acute side of the wedge-shaped cross-section, between the sides 174a and 174b faces the image sensor. A respective other side 174a or 174b may consequently deflect the optical path of the optical channels by smaller rotational movements. It becomes obvious here that the rotation can be performed such that space requirements of the beam-deflecting means along the thickness direction 182 are low since such a movement of the beam-deflecting element 172 that a main side is perpendicular to the image sensor is not required.

The side 174c may also be referred to as secondary side or backside. Several beam-deflecting elements may be connected to one another such that one connective element is arranged at the side 174c, or passes through the cross-section of the beam-deflecting elements, i.e. arranged within the beam-deflecting elements, like in the region of the displacement axis 176. In particular, the holding element may be arranged such that it does not protrude beyond the beam-deflecting element 172 along the direction 182, or only to a low extent, i.e. at most 50%, at most 30% or at most 10%, so that the holding element does not increase or determine the extension of the entire setup along the direction 182. Alternatively, the extension of the thickness direction 182 may be determined by the lenses of the optical channels, which means that these exhibit the dimension defining the minimum of thickness.

The beam-deflecting element 172 may be formed from glass, ceramics, glass ceramics, plastics, metal or a combination of these materials and/or further materials.

In other words, the beam-deflecting element 172 may be arranged such that the tip, i.e. the edge between the main side 174a and 174b, is directed towards the image sensor. The beam-deflecting elements may be held such that this is done only on the backside or within the beam-deflecting elements, which means that the main sides are not masked. A common holding or connective element may extend over the backside 174c. The rotational axis of the beam-deflecting element 172 may be arranged to be eccentric.

Figure 4C:
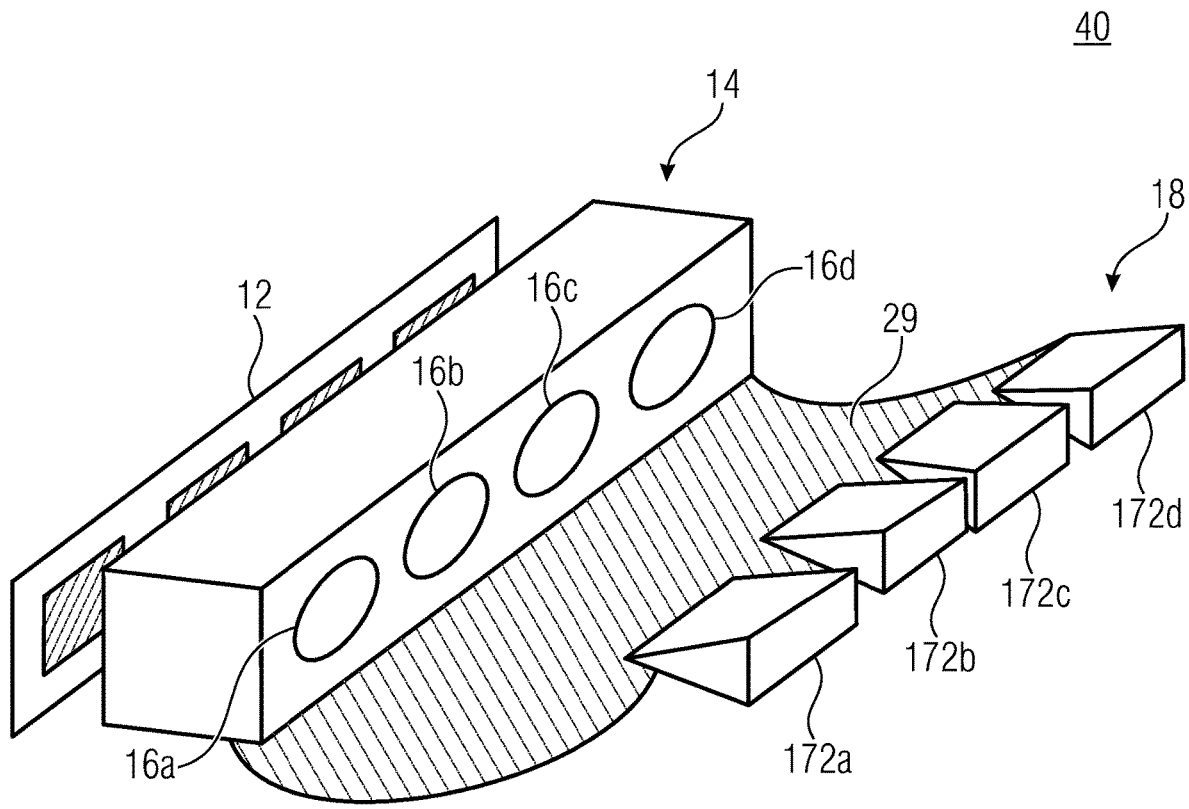

FIG. 4c shows a schematic perspective view of a multi-aperture imaging device 40 comprising an image sensor 12 and a single-line array 14 of optical channels 16a-d arranged next to one another. The beam-deflecting means 18 comprises a number of beam-deflecting elements 172a-d which may correspond to the number of optical channels. Alternatively, a smaller number of beam-deflecting elements may be arranged, like when at least one beam-deflecting element is used by two optical channels. Alternatively, a higher number thereof may also be arranged, like when the direction of deflection of the beam-deflecting means 18 is switched by a translational movement. Each beam-deflecting element 172a-d may be associated to an optical channel 16a-d. The beam-deflecting elements 172a-d may be formed as a multitude of elements 172. Alternatively, at least two, several or all of the beam-deflecting elements 172a-d may be formed integrally.

Figure 4D:
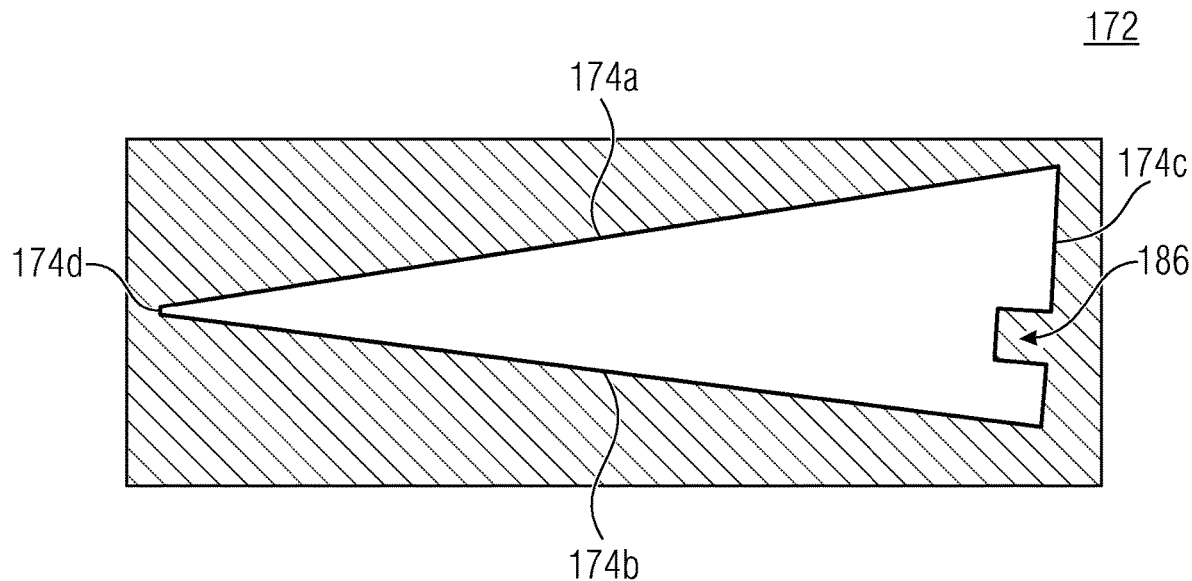

FIG. 4d shows a schematic sectional side view of the beam-deflecting element 172 the cross-section of which is formed as a free-form area which means that it does not necessarily correspond to a simple triangle or quadrangle. Thus, the side 174c may comprise a recess 186 which allows mounting a holding element, wherein the recess 186 may also be formed as a protruding element, like a tongue in a groove-and-tongue system. Additionally, the cross-section comprises a fourth side 174d which comprises smaller an area extension than the main sides 174a and 174b and connects the same to each other.

Figure 4E:
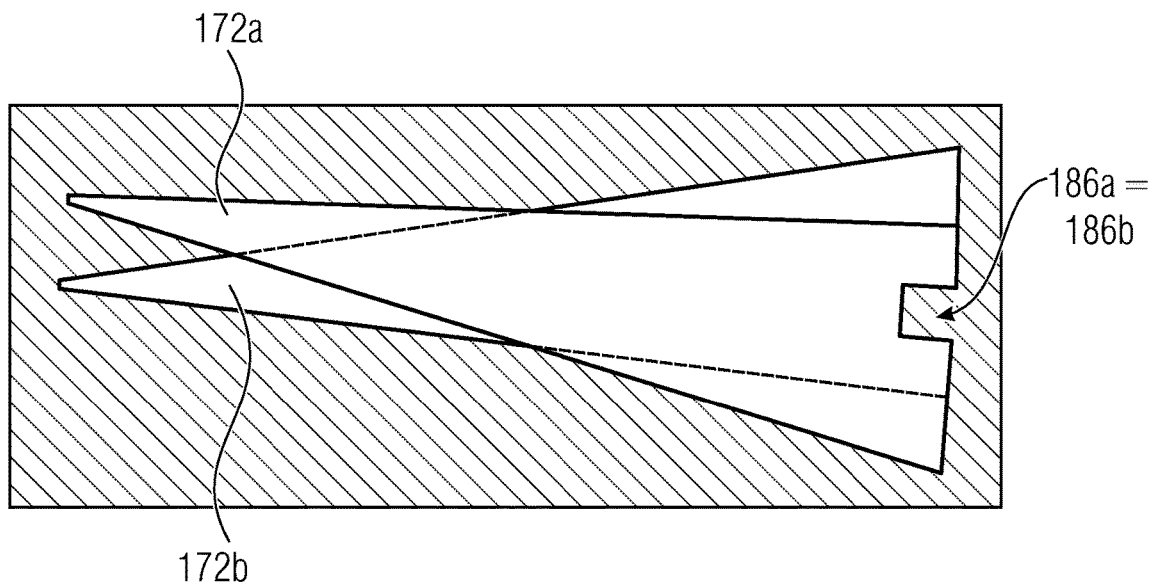

FIG. 4e shows a schematic sectional side view of a first beam-deflecting element 172a and a second beam-deflecting element 172b which, in the direction of illustration, is located behind the same. The recesses 186a and 186b here may be arranged such that they are basically congruent so that arranging a connective element in the recesses is possible.

Figure 4F:
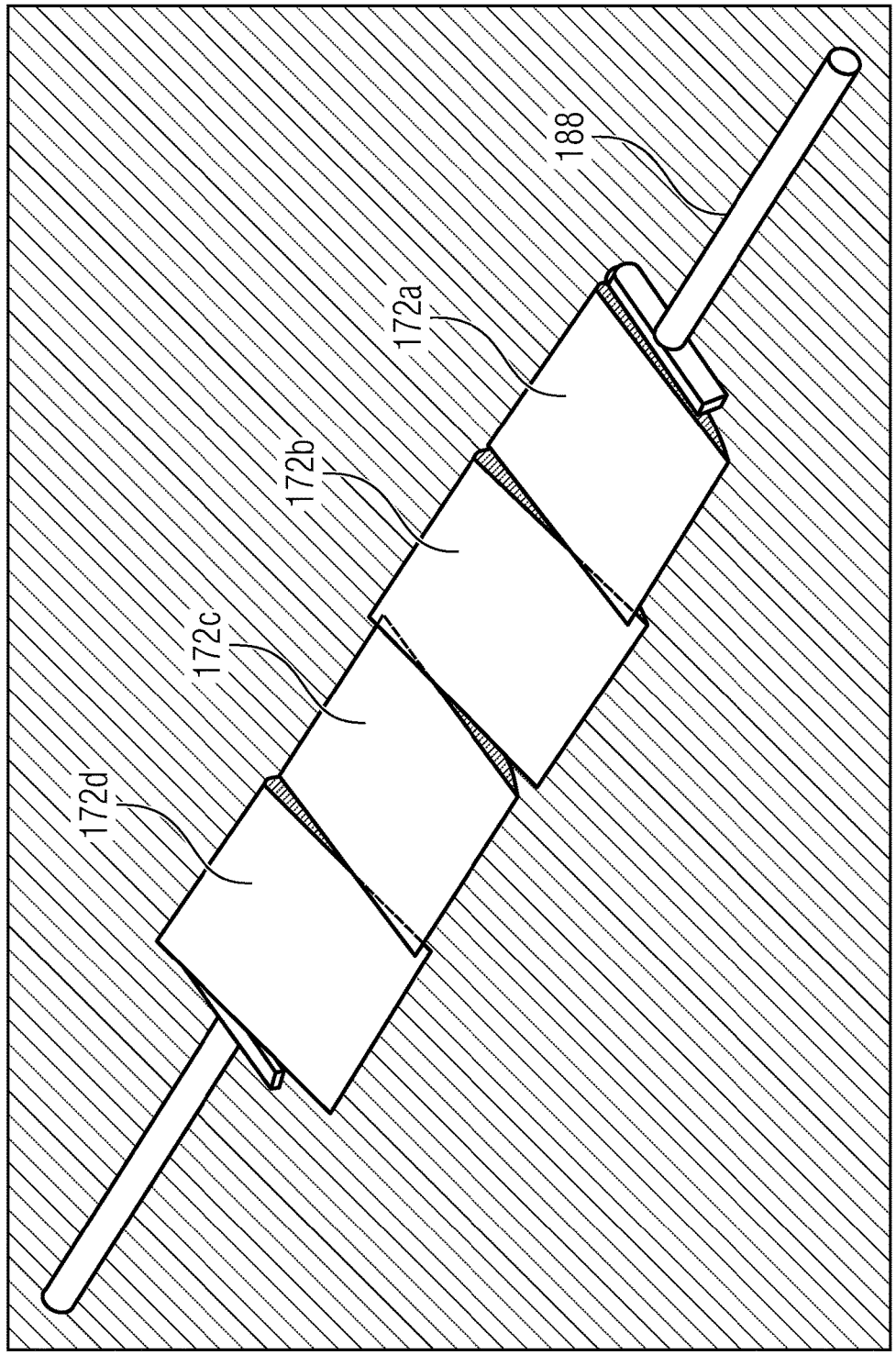

FIG. 4f shows a schematic perspective view of the beam-deflecting means 18 which exemplarily comprises four beam-deflecting elements 172a-d connected to a connective element 188. The connective element may be used to be moved by an actuator in a translational and/or rotational manner. The connective element 188 may be formed integrally and pass along an extension direction, like the y-direction, at or in the beam-deflecting elements 172a-d. Alternatively, the connective element 188 may also be connected only to at least one side of the beam-deflecting means 18, like when the beam-deflecting elements 172a-d are formed integrally. Alternatively, connection to an actuator and/or connection of the beam-deflecting elements 172a-d may take place in any other way, like by means of gluing, wringing or soldering. The beam-deflecting elements 172a-d may be formed to be located at small distances or even to be directly abutting so that no gaps or the smallest gaps possible can be implemented between the beam-deflecting elements 172a-d.

This means that the beam-deflecting means 18 may be formed as an array of facets arranged next to one another, wherein each optical channel is associated to one of the facets. The diaphragm structure may extend over the array of facets.

The beam-deflecting means may comprise a first and a second reflective main side 174a and 174b, wherein the main sides may be inclined relative to each other at an angle δ of 60° or less.

Subsequently, a multi-aperture imaging device 50 which comprises the rotationally movable beam-deflecting means 18 comprising the wedge-shaped facets in accordance with FIGS. 4a-4f will be discussed referring to FIGS. 5a-5c. Exemplarily, respective optics 64 of the array 14 are formed as multi-part lens combinations. The multi-aperture imaging device 50 comprises the diaphragm structure 22 which may exemplarily be mounted mechanically at a connective edge between the main sides 174a and 174b or at the secondary side 174d. The optics 64 may be arranged in a housing 31. Optionally, the image sensor 12 may be arranged within the housing 31. Although the subsequent discussion relates to a housing where the optics 64 are arranged, the same discussion applies in analogy, with no restrictions, to an array of optical channels which exemplarily comprises a carrier, as is described for the carrier 47. The optics 64 may be arranged at the potentially transparent carrier 46, either directly or indirectly via holding structures. The housing 31 may, for example, comprise main sides 311 and 312, wherein the main side 311 is characterized in that it is arranged to be facing the beam-deflecting means 18 and provides a side of the housing 31 adjacent to the beam-deflecting means 18. When, for example, considering FIG. 1, the carrier 47 may also comprise a main side which is arranged to be facing the beam-deflecting means 18, and comprise a main side which is arranged to be facing the image sensor 12. Secondary sides $31_3$ and $31_4$ can connect the two main sides $31_1$ and $31_2$ to each other. At least the main side $31_1$ of the housing 31 may be understood to be a main side of the array.

Figure 5A:
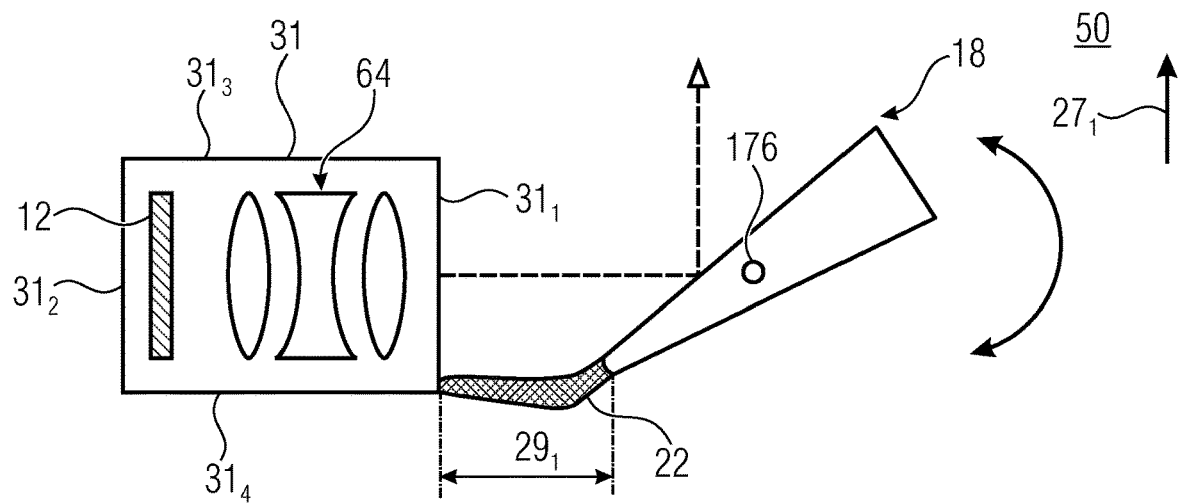
FIG. 5a shows a schematic view of a multi-aperture imaging device in accordance with an embodiment in a first rotational position of the beam-deflecting means where a diaphragm structure closes a gap.

FIG. 5a illustrates the multi-aperture imaging device 50 having a first position of the beam-deflecting means 18 where the diaphragm structure 22 closes the gap $29_1$.

Figure 5B:
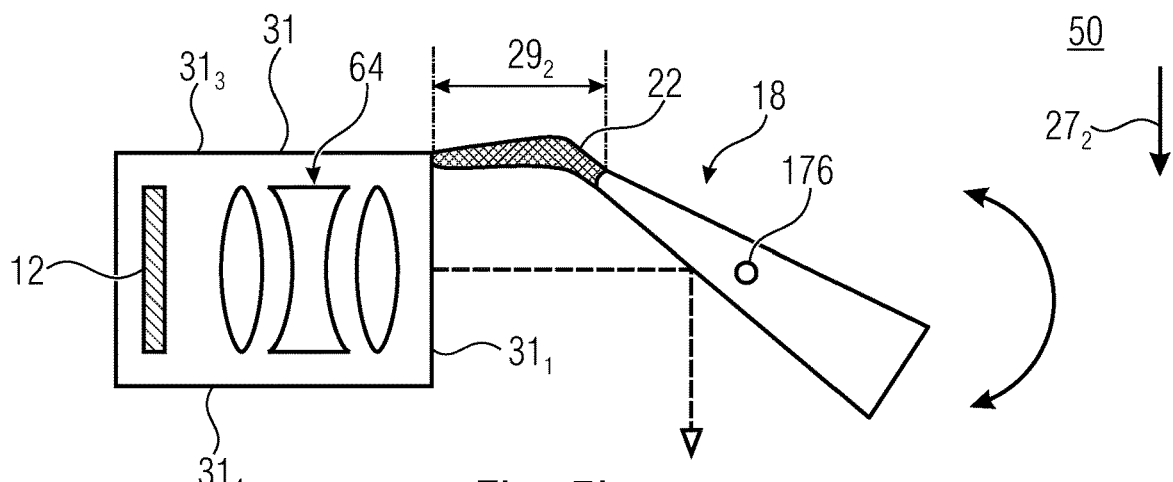
FIG. 5b shows a schematic view of the multi-aperture imaging device of FIG. 5a in the second position of the beam-deflecting means, wherein the diaphragm structure closes a gap at a different position.

FIG. 5b illustrates the multi-aperture imaging device 50 in the second position of the beam-deflecting means 18, wherein the diaphragm structure 22 closes the gap $29_2$. In the first position illustrated in FIG. 5a, the diaphragm structure can mechanically contact at the outermost position possible, i.e. adjacent to the secondary side $31_4$, i.e. the main side $31_1$ adjacent to the secondary side $31_4$ or, as is exemplarily illustrated in FIG. 1, the secondary side $31_4$. FIG. 5b illustrates a situation where the diaphragm structure 22 mechanically contacts the housing 31 or the array adjacent to the secondary side $31_3$.

Figure 5C:
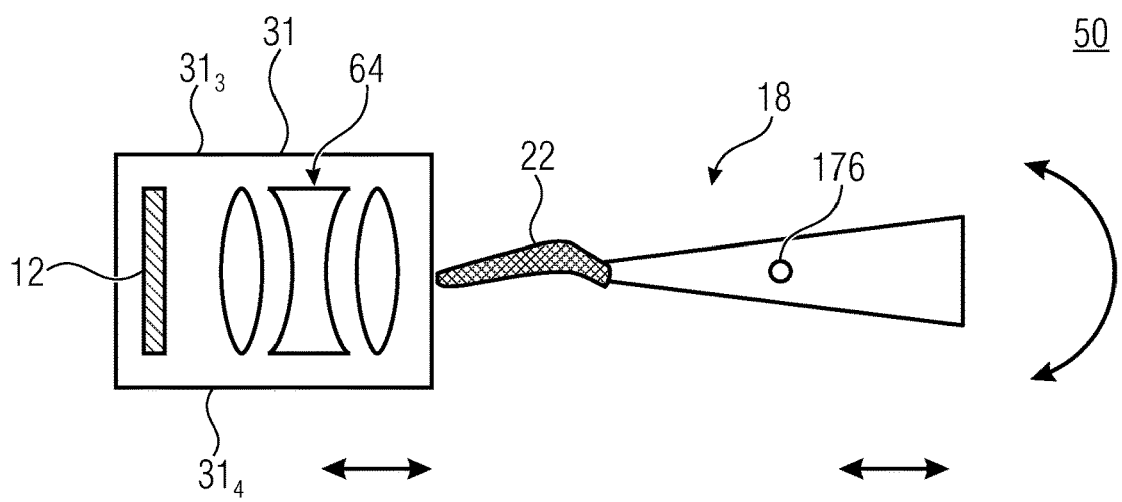
FIG. 5c shows a schematic view of the multi-aperture imaging device of FIG. 5a in an optional intermediate position between the first position and the second position.

FIG. 5c illustrates the multi-aperture imaging device 50 in an optional intermediate position between the first position and the second position. In the third position, the diaphragm structure 22 is directed to a region between the secondary sides $31_3$ and $31_4$. Based on the illustration of FIGS. 5a and 5b, the diaphragm structure 22 may be formed to be elastic or flexible and, for example, provide a flexible diaphragm or sealing lip. Here, the diaphragm structure 22 may comprise elastic materials, like silicon, polyurethane or other elastomers. While switching between the first and second positions, the diaphragm structure 22 may sweep across the main side $31_1$. However, as is illustrated in FIG. 5c, based on a variable distance between the beam-deflecting means 18 and the array 14 or the housing 31, a situation may arise where the diaphragm structure 22 is not in contact with the array 14 or the housing 31. Here, the multi-aperture imaging device 50 may exemplarily comprise an actuator configured to move the beam-deflecting means 18 and/or the array 14 in a translational manner in order to increase a distance between the array and the beam-deflecting means 18 temporarily. This means that the multi-aperture imaging device 50 may be configured to provide, during the rotational movement of the beam-deflecting means, a translational movement between the array 14 and the diaphragm structure 22 in order to increase a distance between the array and the diaphragm structure temporarily.

In other words, a diaphragm, advantageously made of a flexible material, extending over all the facets of the mirror and, thus, the entire width of the array objective is arranged at one side/edge of the beam-deflecting means of the multi-aperture imaging device having a linear channel arrangement. This is similar to a sealing lip. The flexible diaphragm is applied in the two states of usage, i.e. the first and the second position, either above or below the array objective and closes the gap between the array objective and the beam-deflecting means so that stray light cannot enter into the camera or only to a reduced extent. The flexible diaphragm may be applied neither above nor below the array objective in a third state when the camera is not used and when the beam-deflecting means is parked in an intermediate position.

Figure 6:
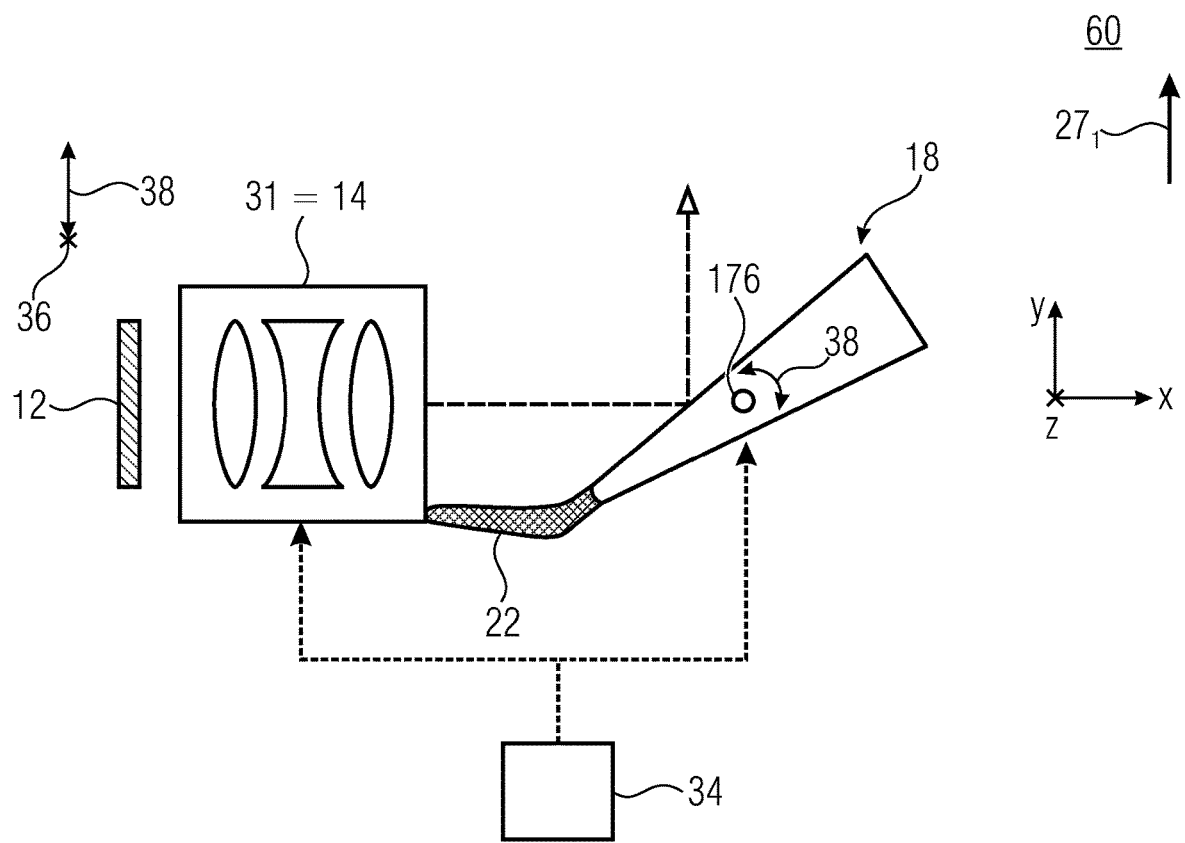
FIG. 6 shows a schematic sectional side view of a multi-aperture imaging device in accordance with an embodiment, comprising an optical image stabilizer.

FIG. 6 shows a schematic sectional side view of a multi-aperture imaging device 60 in accordance with an embodiment. Compared to the multi-aperture imaging device 50, the multi-aperture imaging device 60 comprises an optical image stabilizer 34 configured to apply a force onto the array 14 or the housing 31 and/or the beam-deflecting means 18. Due to the force generated, a relative movement between the image sensor 12, the array 14 and the beam-deflecting means 18 can be obtained, like by a translational displacement of the array 14 along one or both of the image axes of an image provided by the image sensor 12. Alternatively or additionally, a translational relative movement of the beam-deflecting means 18, like along the y-direction and/or a rotational movement around the axis 176, can be generated to obtain optical image stabilization. Optical image stabilization may be of advantage when the multi-aperture imaging device 60 is moved relative to the object region the field of view of which is captured, during a capturing process, during which partial fields of view or the total field of view is/are captured. The optical image stabilizer 34 may be configured to at least partly counteract this movement in order to reduce or prevent blurring of the image. For optical image stabilization along a first image axis 36 which may, for example, be arranged in parallel to the line extension direction z, the optical image stabilizer 34 may be configured to generate a first relative movement between the image sensor 12, the array 14 and the beam-deflecting means 18. For optical image stabilization along a second image axis 38 which here is arranged to be perpendicular thereto, the optical image stabilizer 34 may be configured to generate a second relative movement between the image sensor 12, the array 14 and the beam-deflecting means 18. For the first relative movement, the optical image stabilizer 34 may be configured to displace the array 14 or image sensor 12 along the image axis 36 in a translational manner. Alternatively or additionally, the optical image stabilizer 34 may be configured to generate a translational movement of the beam-deflecting means 18 along the image 36. The optical image stabilizer 34 is configured so as to perform the movements of the components such that the corresponding relative movement will form between the image sensor 12, the array 14 and the beam-deflecting means 18. The relative movement may be performed in parallel to the line extension direction 7 and perpendicular to the optical paths. However, it may be of advantage to cause the array 14 to move relative to the image sensor 12 in a translational movement, for example in order to mechanically stress an electronical connection of the image sensor 12 to further components only to a little extent or not at all.

For generating the second relative movement, the optical image stabilizer 34 may be configured to generate or allow a rotational movement of the beam-deflecting means 18 and/or to provide a translational relative movement between the image sensor 12 and the array 14 along the image axis 38 and/or a translational relative movement between the array 14 and the beam-deflecting means 18, wherein corresponding actuators may be arranged for this. For generating the rotational movement, like in parallel to the rotational movement 38 or as a part thereof, the optical image stabilizer 34 may exemplarily comprise an actuator configured to generate the rotational movement 38. Although an implementation of the optical image stabilizer 34 such that the same controls the first and second relative movements as a translational relative movement is possible for obtaining optical image stabilization, an implementation of the second relative movement to be a rotational movement 38 may be of advantage since in this case a translational movement of components along the second image axis 38 can be avoided. This direction can be in parallel to a thickness direction of the multi-aperture imaging device 60 which, in accordance with some implementations, is to be kept as small as possible. Such a goal can be achieved by the rotational movement.

When considering FIG. 6 and considering the rotational movement 38 and/or a translational movement of the array 14 along the z-direction which may be triggered by the optical image stabilizer 38, a restoring force can be obtained based on the elasticity of the diaphragm structure 22 or the stiffness of the diaphragm structure and the mechanical contact between the diaphragm structure 22 and the array 14 or the beam-deflecting means 18, when the respective relative movement is generated by the optical image stabilizer 34 since deformation of the diaphragm structure 22 takes place based on the relative movement. Alternatively or additionally, such a restoring force may at least partly be obtained also by special separate spring structures, like elastic connective elements. The restoring force may be configured to restore at least 30%, at least 20% or at least 10% of a maximum relative movement, i.e. of a maximum deflection in connection with the relative movement by the optical image stabilizer 34 when withdrawing the force of the optical image stabilizer 34.

In other words, the flexible diaphragm 22 itself or additionally introduced or applied elements may serve as spring elements for the beam-deflecting means and thus have a restoring effect, for example when using the latter for optical image stabilization.

Figure 7:
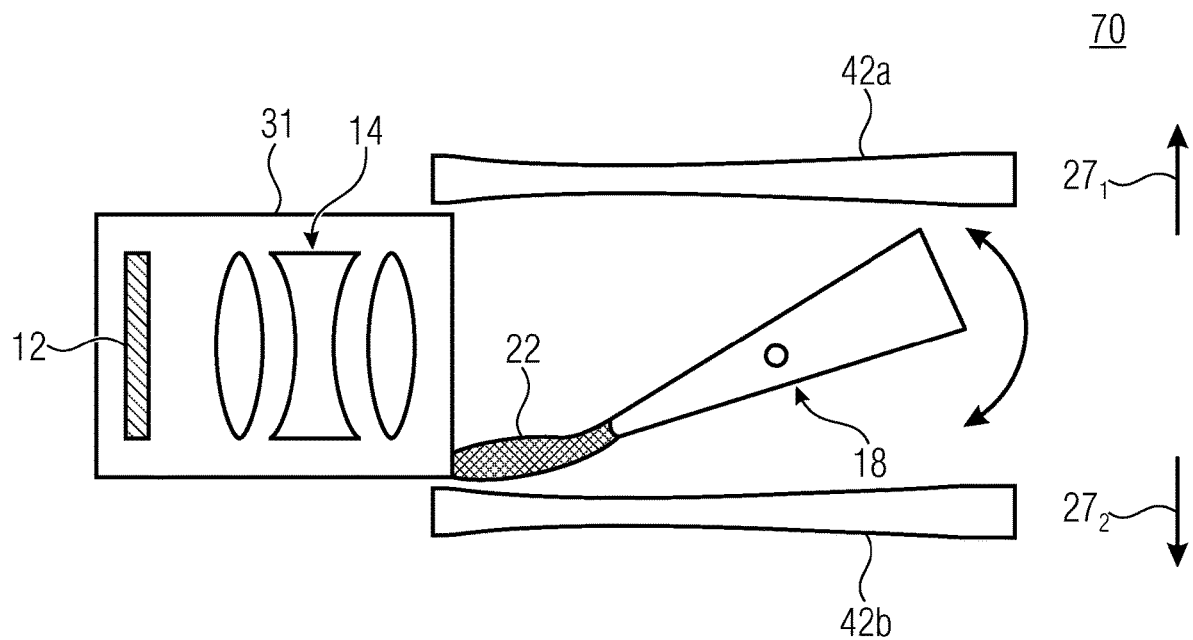
FIG. 7 shows a schematic perspective view of a multi-aperture imaging device in accordance with an embodiment, comprising transparent structures arranged along the viewing directions of the multi-aperture imaging device starting from the beam-deflecting means.

FIG. 7 shows a schematic perspective view of a multi-aperture imaging device 70 in accordance with an embodiment, which comprises transparent structures 42a and 42b arranged along the viewing directions $27_1$ and $27_2$ when starting from the beam-deflecting means 18. The transparent structures 42a and 42b may be configured to prevent dirt or particles from entering the housing 31, the beam-deflecting means 18 or other components. Alternatively or additionally, contacting the beam-deflecting means 18, like by a finger of a user or the like, can be prevented or made more difficult. The multi-aperture imaging device 70 exemplarily comprises two viewing directions and two transparent structures 42a and 42b, wherein each of the transparent structures 42a and 42b may be associated each with one of the viewing directions $27_1$ and $27_2$, respectively. When, for example, considering the multi-aperture imaging device 10 which may be configured to exhibit only one viewing direction, the multi-aperture imaging device may be implemented also with only one transparent structure 42.

The transparent structures 42a may, for example, comprise a glass material and/or a polymer material and may be formed to be basically transparent for electromagnetic radiation to be captured by the multi-aperture imaging device 70, wherein it may also be conceivable for filters to be introduced into the transparent structure. The transparent structures 42a and/or 42b may comprise a surface roughness which is low, which means that the transparent structures 42a and/or 42b may be formed to be smooth.

An exemplary, but not limiting value of roughness $R_a$ for the transparent structures 42a and/or 42b may, for example, be at most 0.03 μm, at most 0.005 μm or at most 0.0005 μm. The diaphragm structure 22 may exhibit a roughness roughness value of which is comparatively greater than the roughness of the transparent structures 42a and/or 42b. This allows making more difficult or even avoiding the diaphragm structure 22 from adhering to a transparent structure 42a and/or 42b in the case of mechanical contact between the same. This means that, as an alternative to the mechanical contact with the array 14, the diaphragm structure 22 may be in mechanical contact with the transparent structure 42a and/or 42b, like alternatingly in time. In the first position and in the second position, the diaphragm structure may be in mechanical contact with the array or one of the transparent structures 42a and 42b on the one hand and the beam-deflecting means 18 on the other hand.

In other words, the flexible diaphragm 22 may comprise a rough surface so that the diaphragm does not adhere to smooth surfaces, like the cover glasses 42a and/or 42b, and/or can be removed from the surface at low forces applicable by the beam-deflecting means. This means that, even when adhering occurs, the diaphragm structure 22 may be easily removed from the transparent structures 42a and/or 42b by the rotational movement.

Figure 8:
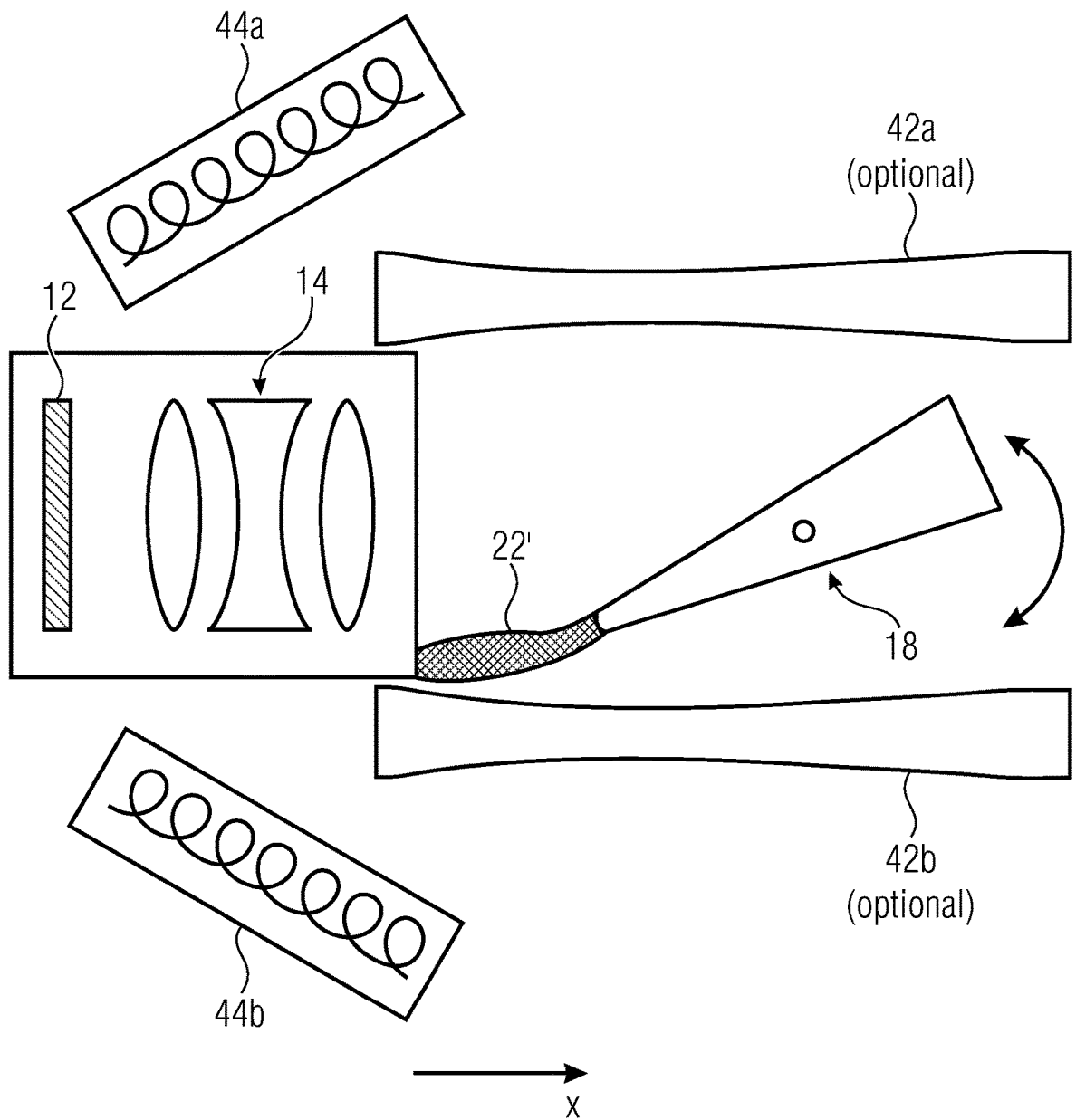
FIG. 8 shows a schematic sectional side view of a multi-aperture imaging device in accordance with an embodiment which may optionally comprise the transparent structures, but may also easily be executed without the same.

FIG. 8 shows a schematic sectional side view of a multi-aperture imaging device 80 which may optionally comprise the transparent structures 42a and 42b, but may easily also be implemented without the same. The multi-aperture imaging device 80 comprises a diaphragm structure 22' which may be implemented to be similar to the diaphragm structure 22, but may additionally comprise a magnetic or magnetizable material, like ferromagnetic or paramagnetic materials. These materials may, for example, be introduced into the material of the diaphragm structure 22 as partides, chips, shavings or grindings. This means that the diaphragm structure 22' may comprise magnetic materials. A magnetic field-providing element 44a and/or 44b, i.e. a magnetic field source, may be arranged adjacent to the housing 31 and/or the transparent structures 42a and/or 42b and, consequently, adjacent to the diaphragm structure 22. The magnetic field-providing elements 44a and/or 44b may advantageously be elements which, in a timely alternating manner, provide a comparatively strong and a comparatively weak or no magnetic field. The magnetic field sources 44a and 44b may, for example, be electromagnets. Alternatively or additionally, it is also conceivable for the magnetic field sources to comprise permanent magnets, for example, and be arranged at a variable distance to the diaphragm structure 22' in order to provide a comparatively large magnetic field with small a distance and a comparatively low magnetic field with high a distance.

Magnetic fields of the magnetic field sources 44a and 44b may be implemented such that an attractive force is applied to the diaphragm structure 22' based on the magnetic field so that the attractive force performs, or at least supports, the rotational movement of the beam-deflecting means 18. Alternatively or additionally, it is also conceivable for, after the rotational movement of the beam-deflecting means 18, a part of the diaphragm structure 22' maybe remaining in the field of view of the array 14 to be moved, i.e. pulled out, from this field of view by the attractive force.

In other words, electromagnets attracting the flexible diaphragm in additional to the rotational movement of the beam-deflecting means 18 may be formed above and below the array objective from a coil and, maybe, an additional core so that the diaphragm exhibits a still improved light-sealing effect.

The previously described arrangement of a diaphragm structure allows improving stray light suppression in multi-aperture imaging devices. Such multi-aperture imaging devices and/or multi-aperture imaging systems may be applied in concepts having a linear channel arrangement and the smallest size possible.

In accordance with embodiments, focusing means may be provided, configured to change a focus of the multi-aperture imaging device 80 or another multi-aperture imaging device described herein, like the multi-aperture imaging device 10, 20, 30, 40, 50, 60 or 70, in a channel-individual manner, for two or several, maybe all of the optical channels together. Here, an actuator may be used in order to change a distance between the array 14 and the image sensor 12, for example. This may result in a variable distance between the array 14 and the beam-deflecting means 18, like when the optics of the optical channel, i.e. the objective, is moved axially. Due to a flexible or elastic diaphragm, the gap between the array 14 and the beam-deflecting means 18 may remain closed, like when an axial extension of the diaphragm structure 22' along the x-direction is greater than or equaling a maximum distance between the array 14 and the beam-deflecting means 18. When decreasing the distance and/or subsequently increasing the same, a compression/elongation or deformation of the diaphragm structure 22' may keep the gap closed.

Figure 9:
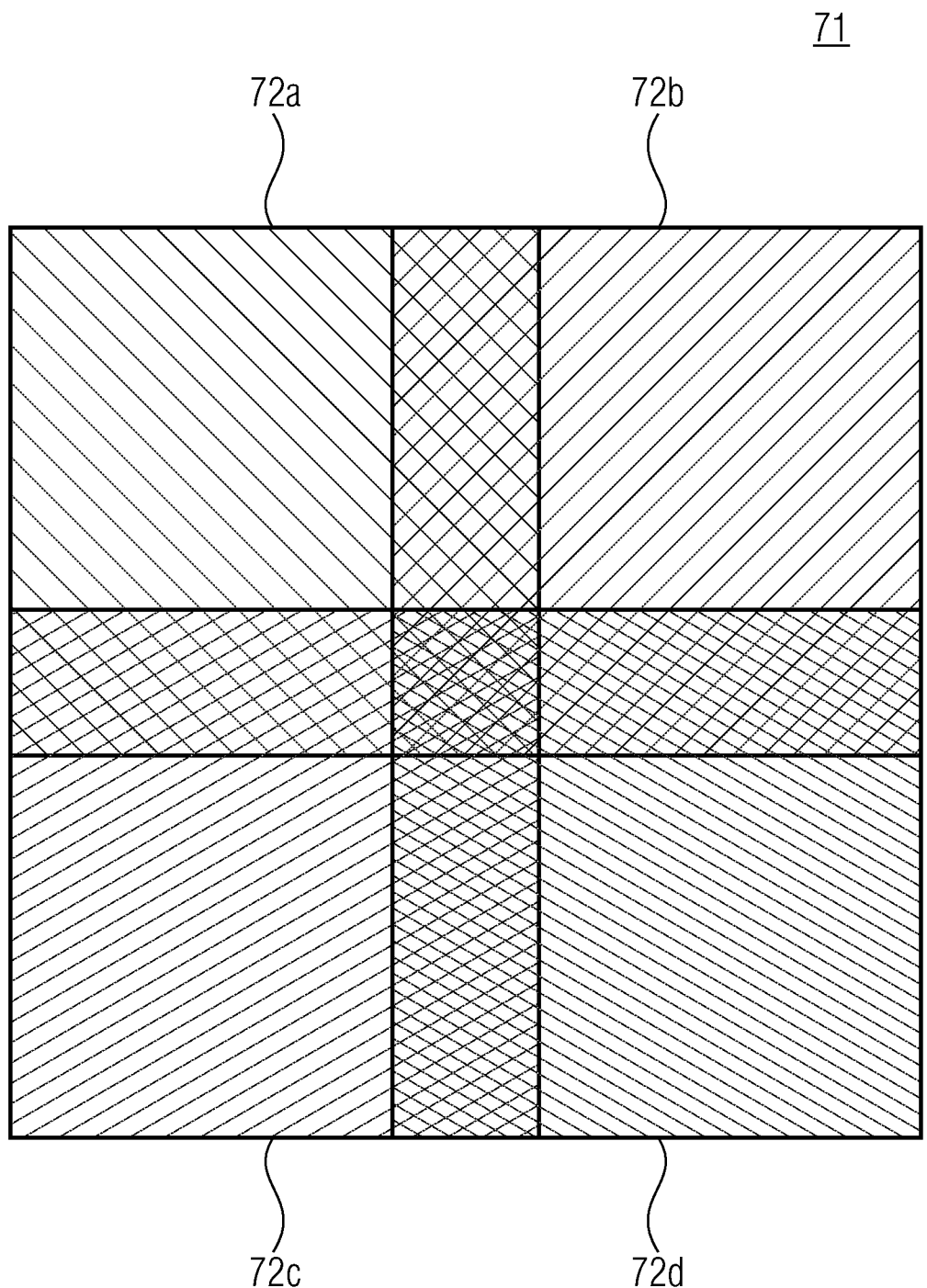
FIG. 9 shows a schematic illustration of a total field of view in accordance with an embodiment, as may, for example, be captured using a multi-aperture imaging device as described before.

FIG. 9 shows a schematic illustration of a total field of view 71, as may, for example, be captured using a multi-aperture imaging device described before, like the multi-aperture imaging device 10, 20, 30, 40, 50, 60, 70 or 80. Although the multi-aperture imaging devices described herein are described such that they exemplarily comprise four optical channels for capturing four partial fields of view 72a-72d of the total field of view, it is to be pointed out that the multi-aperture imaging devices described herein may also be formed with a different number of optical channels, like a number of at least 2, at least 3, at least 4, at least 10, at least 20 or an even higher value. In addition, it is to be pointed out that it is conceivable for some of the partial fields of view 72a-72d to be captured by a number of greater than one optical channel. The optical paths of the optical channels of the multi-aperture imaging devices may be directed to mutually different partial fields of view 72a-d, wherein a partial field of view 72a-d may be associated to each optical channel. Exemplarily, the partial fields of view 72a-d are overlapping in order to allow joining individual partial images to form a total image. When the multi-aperture imaging device comprises a number of optical channels differing from 4, the total field of view 71 may comprise a number of partial fields of view differing from 4. Alternatively or additionally, at least one partial field of view 72a-d may be captured by a second or a higher number of optical channels having a higher number of modules (multi-aperture imaging devices) in order to form stereo, trio, quattro cameras or higher-value cameras. The individual modules may be displaced by fragments of a pixel and be configured to implement methods of super-resolution. A number of optical channels and/or a number of multi-aperture imaging devices and/or a number of partial fields of view may be chosen as desired, for example.

Figure 10:
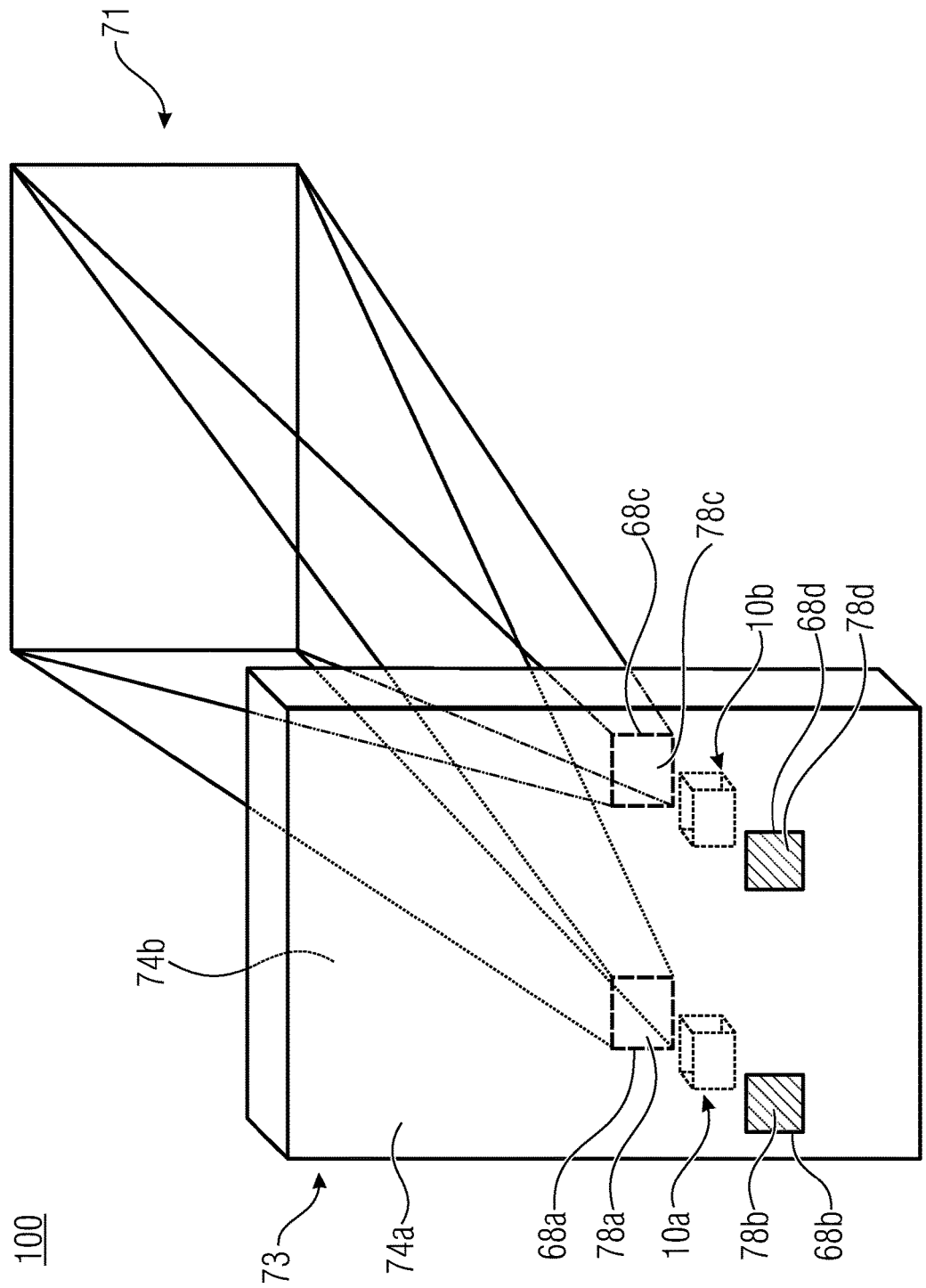
FIG. 10 shows a schematic perspective view of an imaging system comprising a housing and at least a first and a second multi-aperture imaging device.

FIG. 10 shows a schematic perspective view of an imaging system 100 comprising a housing 73 and a first multi-aperture imaging device 10a and a second multi-aperture imaging device 10b which are arranged in the housing 73. The imaging system 100 is configured to capture the total field of view 71 at least partly, like in the overlap region of the capture regions of the multi-aperture imaging devices 10a and 10b, stereoscopically using the multi-aperture imaging devices 10a and 10b. The overlap region may form a part of the total field of view 71, but may also nearly completely or completely cover the entire field of view 71, i.e. to a portion of at least 95%, at least 97% or at least 99%. The total field of view 71 is, for example, arranged at a main side 74b of the housing 73 facing away from a main side 74a. Exemplarily, the multi-aperture imaging devices 10a and 10b can capture the total field of view 71 through transparent regions 68a and 68c, wherein diaphragms 78a and 78c arranged in the main side 74b are at least partly transparent. Diaphragms 78b and 78d arranged in the main side 74a may comprise transparent regions 78b and 78d, respectively, which optically seal, at least partly, the transparent regions 68b and 68d so that an extent of stray light from a side facing the main side 74a, which may corrupt images captured by the multi-aperture imaging devices 10a and/or 10b, is at least reduced.

Although the multi-aperture imaging devices 10a and 10b are illustrated to be arranged to be spatially separate from each other, the multi-aperture imaging devices 10a and 10b may also be arranged in a spatially adjacent or in a combined manner. Exemplarily, the arrays of the imaging devices 10a and 10*b* may be arranged next to each other or in parallel to each other. The arrays may be formed in single lines and may form lines arranged relative to one another, wherein each multi-aperture imaging device 10*a* and 10*b* comprises a single-line array. The multi-aperture imaging devices 10*a* and 10*b* may comprise common beam-deflecting means and/or a common carrier 47 and/or a common image sensor 12. At least the multi-aperture imaging device 20, 30, 40, 50, 60, 70 and/or 80 may be arranged as an alternative or in addition to the multi-aperture imaging device 10*a* and/or 10*b*, and/or a further multi-aperture imaging device 10. The common elements described above, like the beam-deflecting means 18 or the array 14, may be used by a common optical image stabilizer, since a movement of the beam-deflecting means, for example, may have an effect for optical channels of several modules together, which allows common optical image stabilization. Correspondingly, the optical image stabilizer may also be embodied for several modules together and/or a common reference channel may be used for several modules.

The transparent regions 68*a-d* may additionally be equipped with a switchable diaphragm 78*a-d* which covers the optical setup in the case of not being used. The diaphragms 78*a-d* may comprise a mechanically moved part. The movement of the mechanically moved part may take place by using an actuator, as may, for example, be provided for other types of movement as well. Alternatively or additionally, the diaphragms 78*a-d* may be controllable electrically and comprise an electrochromic layer or an electrochromic sequence of layers, i.e. be implemented as an electrochromic diaphragm.

Figure 11:
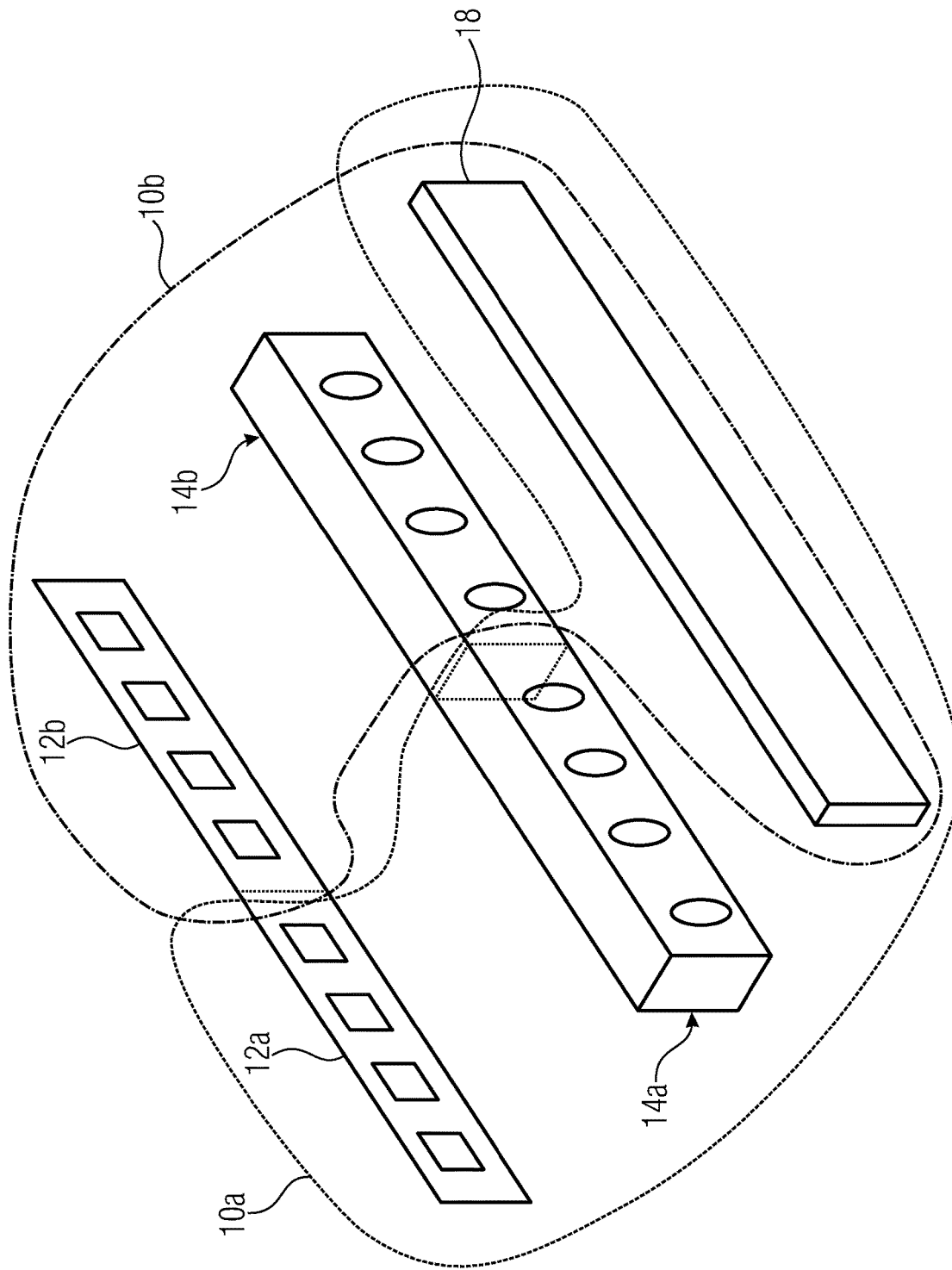
FIG. 11 shows a schematic setup comprising a first multi-aperture imaging device and a second multi-aperture imaging device, as may, for example, be arranged in the imaging system of FIG. 10, in accordance with an embodiment.

FIG. 11 shows a schematic setup comprising a first multi-aperture imaging device 10*a* and a second multi-aperture imaging device 10*b* as may, for example, be arranged in the imaging system 100. The arrays 14*a* and 14*b* may be formed in a single line and may form one common line. The image sensors 12*a* and 12*b* may be marked on a common substrate, or on a common circuit carrier, like a common circuit board or a common flex board. Alternatively, the image sensors 12*a* and 12*b* may also comprise mutually different substrates. Different mixtures of these alternatives are, of course, also possible, like multi-aperture imaging devices comprising a common image sensor, a common array and/or common beam-deflecting means 18, and further multi-aperture imaging devices comprising separate components. Of advantage with a common image sensor, a common array and/or common beam-deflecting means is the fact that moving the respective components at great a precision can be obtained by driving a small number of actuators and that synchronization between actuators can be reduced or avoided. In addition, high a thermal stability can be obtained. Alternatively or additionally, other and/or mutually different multi-aperture imaging devices may comprise a common array, a common image sensor and/or common beam-deflecting means.

FIG. 12 shows a schematic flowchart of a method 1200 for providing a multi-aperture imaging device, like the multi-aperture imaging device 10.

The method 1200 comprises a step 1210 in which providing an array of optical channels takes place so that each optical channel comprises optics for imaging a partial field of view of a total field of view onto an image sensor region of an image sensor. In step 1220, arranging beam-deflecting means for deflecting an optical path of the optical channels to a viewing direction of the multi-aperture imaging device takes place. In step 1230, arranging a diaphragm structure in order to at least partly close a gap between the array and the beam-deflecting means takes place.

Although some aspects have been described in connection with a device, it is to be understood that these aspects also represent a description of the corresponding method so that a block or element of a device is to be understood to be also a corresponding method step or a feature of a method step. In analogy, aspects having been described in connection with or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A multi-aperture imaging device comprising:
   an array of optical channels, wherein each optical channel comprises optics for imaging a partial field of view of a total field of view onto an image sensor region of an image sensor;
   a beam-deflecting unit for deflecting an optical path of the optical channels to a viewing direction of the multi-aperture imaging device; and
   a diaphragm structure arranged to at least partly close a gap between the array and the beam-deflecting unit;
   wherein the array comprises, arranged at a distance to the beam-deflecting unit, a carrier for holding the optics, a housing of the array or a transparent structure configured to at least partly reduce the entrance of particles to the beam-deflecting unit, the distance forming the gap; and
   wherein the diaphragm structure closes the gap by mechanical contact with the carrier, the housing or the transparent structure on the one hand and the beam-deflecting unit on the other hand.

2. The multi-aperture imaging device in accordance with claim 1, wherein a dimension of the gap can be changed by driving the beam-deflecting unit to switch between a first and a second rotational position.

3. The multi-aperture imaging device in accordance with claim 1, wherein the optical channels between the array and the beam-deflecting unit pass along the gap and the diaphragm structure.

4. The multi-aperture imaging device in accordance with claim 1, wherein a direction which an optical path of an optical channel is deflected to by the beam-deflecting unit is associated to each partial field of view, the diaphragm structure being configured to at least partly reduce the entrance of light from a direction which is different from the directions associated to the partial fields of view along the viewing direction.

5. The multi-aperture imaging device in accordance with claim 1, wherein the diaphragm structure is arranged along a direction along which the optical paths of the optical channels between the array and the beam-deflecting unit pass.

6. The multi-aperture imaging device in accordance with claim 1, wherein the beam-deflecting unit is configured to, in a first position, direct the optical paths to a first viewing direction and to deflect, in a second position, the optical paths to a second viewing direction, wherein the beam-deflecting unit is supported to be rotationally movable and is movable in a rotational manner between the first position and the second position.

7. The multi-aperture imaging device in accordance with claim 6, wherein the diaphragm structure is mechanically connected to the beam-deflecting unit and is movable together with the beam-deflecting unit.

8. The multi-aperture imaging device in accordance with claim 6, wherein the diaphragm structure, in the first position and in the second position, is in mechanical contact with the array or a transparent structure configured to at least partly reduce the entrance of particles to the beam-deflecting unit on the one hand and the beam-deflecting unit on the other hand.

9. The multi-aperture imaging device in accordance with claim 6, wherein the diaphragm structure in the first position, adjacent to a first secondary side of the array, is in mechanical contact with the same and is in mechanical contact in the second position, adjacent to an opposite second secondary side of the array, and wherein the beam-deflecting unit comprises a third position which is arranged rotationally between the first position and the second position and in which the diaphragm structure is spaced apart from the first and second secondary sides of the array.

10. The multi-aperture imaging device in accordance with claim 9, configured to provide during the rotational movement a translational movement between the array and the diaphragm structure in order to temporarily increase a distance between the array and the diaphragm structure.

11. The multi-aperture imaging device in accordance with claim 1, wherein the diaphragm structure is configured to be in mechanical contact with the array or a transparent structure configured to at least partly reduce the entrance of particles to the beam-deflecting unit on the one hand and the beam-deflecting unit on the other hand when the optical paths are deflected, wherein the diaphragm structure comprises a mechanical stiffness which, with a relative movement between the array and the beam-deflecting unit for optical image stabilization, generates a restoring force configured to restore at least 30% of a maximum relative movement.

12. The multi-aperture imaging device in accordance with claim 1, wherein the diaphragm structure comprises a magnetic material and wherein a magnetic field-providing element is arranged adjacent to the diaphragm structure, and is configured to attract the diaphragm structure.

13. The multi-aperture imaging device in accordance with claim 1, wherein a transparent structure is arranged along a direction along which the optical paths are deflected, and is configured to at least partly reduce the entrance of particles to the beam-deflecting unit, wherein a surface roughness of the diaphragm structure is greater than a surface roughness of the transparent structure.

14. The multi-aperture imaging device in accordance with claim 1, wherein the beam-deflecting unit is formed as an array of facets arranged next to one another, wherein each optical channel is associated to one of the facets, wherein the diaphragm structure extends over the array of facets.

15. The multi-aperture imaging device in accordance with claim 1, wherein the diaphragm structure is formed to be elastic.

16. The multi-aperture imaging device in accordance with claim 1, wherein the diaphragm structure is formed to be partly or completely opaque.

17. The multi-aperture imaging device in accordance with claim 1, wherein the beam-deflecting unit comprises a first reflective main side and a second reflective main side, wherein the first and second reflective main sides are inclined relative to each other at an angle of at most 60°.

18. The multi-aperture imaging device in accordance with claim 1, wherein the array comprises a transparent carrier through which the optical channels pass and to which the optics are mounted.

19. The multi-aperture imaging device in accordance with claim 1, comprising a focusing unit for setting a focus of the multi-aperture imaging device by changing a distance between the array and the beam-deflecting unit.

20. An imaging system comprising a first module comprising a multi-aperture imaging device in accordance with claim 1 and a second module comprising a multi-aperture imaging device in accordance with claim 1, wherein the first and second modules are configured to capture the total field of view at least stereoscopically.

21. The imaging system in accordance with claim 20, wherein the first module and the second module comprise at least one of a common array of a common beam-deflecting unit and a common image sensor.

22. A method for providing a multi-aperture imaging device, comprising:
providing an array of optical channels so that each optical channel comprises optics for imaging a partial field of view of a total field of view onto an image sensor region of an image sensor;
arranging a beam-deflecting unit for deflecting an optical path of the optical channels to a viewing direction of the multi-aperture imaging device; and
arranging a diaphragm structure in order to at least partly close a gap between the array and the beam-deflecting unit;
so that the array comprises, arranged at a distance to the beam-deflecting unit, a carrier for holding the optics, a housing of the array or a transparent structure configured to at least partly reduce the entrance of particles to the beam-deflecting unit, the distance forming the gap; and
so that the diaphragm structure closes the gap by mechanical contact with the carrier, the housing or the transparent structure on the one hand and the beam-deflecting unit on the other hand.

* * * * *